United States Patent
Moore et al.

(10) Patent No.: US 10,380,914 B2
(45) Date of Patent: Aug. 13, 2019

(54) IMAGING GLOVES INCLUDING WRIST CAMERAS AND FINGER CAMERAS

(71) Applicant: Toyota Motor Engineering & Manufacturing North America, Inc., Erlanger, KY (US)

(72) Inventors: Douglas A. Moore, Livermore, CA (US); Joseph M. A. Djugash, San Jose, CA (US); Yasuhiro Ota, Santa Clara, CA (US); Shin Sano, San Francisco, CA (US); Sarah Rosenbach, Berkeley, CA (US); Sho Hiruta, San Francisco, CA (US); Maura Hoven, San Francisco, CA (US)

(73) Assignee: TOYOTA MOTOR ENGINEERING & MANUFACTURNIG NORTH AMERICA, INC., Plano, TX (US)

( * ) Notice: Subject to any disclaimer, the term of this patent is extended or adjusted under 35 U.S.C. 154(b) by 380 days.

(21) Appl. No.: 14/567,054

(22) Filed: Dec. 11, 2014

(65) Prior Publication Data
US 2016/0171907 A1     Jun. 16, 2016

(51) Int. Cl.
G09B 21/00     (2006.01)
G06F 3/01      (2006.01)
A41D 19/00     (2006.01)

(52) U.S. Cl.
CPC ........... *G09B 21/001* (2013.01); *G06F 3/014* (2013.01); *G09B 21/003* (2013.01); *G09B 21/006* (2013.01); *A41D 19/0024* (2013.01)

(58) Field of Classification Search
CPC ........................... G09B 21/006; G09B 21/001

USPC ......................................................... 434/116
See application file for complete search history.

(56) References Cited

U.S. PATENT DOCUMENTS

| 5,543,972 A | 8/1996 | Kamewada |
| 6,159,013 A | 12/2000 | Parienti |
| 8,177,705 B2 | 5/2012 | Abolfathi |
| 8,538,087 B2 | 9/2013 | Minoni et al. |

(Continued)

FOREIGN PATENT DOCUMENTS

| CN | 202496448 | 10/2012 |
| EP | 1721237 | 8/2012 |

(Continued)

OTHER PUBLICATIONS

MIT.pdf (FingerReader / Jul. 1, 2014).*

(Continued)

*Primary Examiner* — Thomas J Hong
(74) *Attorney, Agent, or Firm* — Dinsmore & Shohl LLP

(57) ABSTRACT

Imaging gloves including wrist cameras and finger cameras are disclosed. An imaging glove includes a wrist portion, a finger portion extending from the wrist portion, a wrist camera coupled to the wrist portion, a finger camera coupled to the finger portion, a processor communicatively coupled to the wrist camera and the finger camera, a memory module communicatively coupled to the processor, and machine readable instructions stored in the memory module. When executed by the processor, the machine readable instructions cause the imaging glove to receive image data from the wrist camera or the finger camera, recognize an object in the received image data, and provide output indicative of the recognized object.

18 Claims, 6 Drawing Sheets

(56) References Cited

U.S. PATENT DOCUMENTS

| | | | |
|---|---|---|---|
| 2003/0020629 A1* | 1/2003 | Swartz | G06F 1/163 340/4.41 |
| 2005/0022108 A1 | 1/2005 | Carro et al. | |
| 2008/0210474 A1 | 9/2008 | Lae et al. | |
| 2008/0248673 A1 | 10/2008 | Boehnein | |
| 2008/0316178 A1 | 12/2008 | Caliksan | |
| 2009/0002345 A1 | 1/2009 | Burstrom et al. | |
| 2009/0057356 A1* | 3/2009 | Woodman | A45C 11/38 224/219 |
| 2011/0221670 A1 | 9/2011 | King, III et al. | |
| 2012/0092161 A1 | 4/2012 | West | |
| 2013/0039152 A1 | 2/2013 | Liu | |
| 2014/0270528 A1 | 9/2014 | Ramos | |
| 2015/0062024 A1 | 3/2015 | Kim | |
| 2015/0130698 A1* | 5/2015 | Burgess | G06F 1/163 345/156 |
| 2015/0237181 A1* | 8/2015 | Khan | H04M 1/0202 455/556.1 |
| 2016/0012749 A1* | 1/2016 | Connor | G09B 5/00 600/13 |

FOREIGN PATENT DOCUMENTS

| | | |
|---|---|---|
| GB | 2448166 | 10/2008 |
| WO | 2008008791 | 1/2008 |
| WO | 2010062481 | 6/2010 |

OTHER PUBLICATIONS

Harmon Revisited.pdf (OEP's Advanced Therapist 1990 by Sarah Cobb).*

MIT FingerReader wearable gadget could help the blind read (https://bgr.com/2014/04/18/mit-fingerreader-wearable-gadget/) (accessed Apr. 29, 2014).

OrCam—See for Yourself (http://www.orcam.com) (accessed Dec. 10, 2014).

GoPro Official Website: The World's Most Versatile Camera (http://gopro.com) (accessed Dec. 10, 2014).

Voice Stick: Portable text scanning device for the visually impaired (http://www.tuvie.com/voice-stick-portable-text-scanning-device-for-the-visually-imparied) (accessed Apr. 29, 2014).

Assistive text reading from complex background for blind persons, Chucai Yi (http://www-ee.ccny.cuny.edu/wwwn/yltian/Publications/CBDAR11-Yi-Tian.pdf) (accessed Apr. 29, 2014).

A pragmatic approach to aid visually impaired people in reading, visualizing and understanding textual contents with automatic electronic pen, Abstract, Kumar et al, 2011 IEEE International Conference on Computer Science and Automation Engineering (vol. 4), ISBN 978-1-4244-8727-1 (http://ieeexplore.ieee.org/xpl.login.jsp?tp=&arnumber=5952925&url=http%3A%2F%2Fieeexplore.ieee.org%2Fxpls%2Fabs_all.jsp%3Farnumber%3D5952925) (accessed Apr. 29, 2014).

* cited by examiner

IMAGING GLOVES INCLUDING WRIST CAMERAS AND FINGER CAMERAS

TECHNICAL FIELD

The present specification generally relates to imaging devices and, more specifically, to imaging gloves including wrist cameras and finger cameras.

BACKGROUND

Visually impaired individuals may find it difficult to ascertain the content of printed text or to ascertain objects or information in a surrounding environment. It may be desirable for visually impaired individuals to utilize imaging devices to facilitate the recognition of text or objects in the surrounding environment.

Accordingly, a need exists for imaging gloves including wrist cameras and finger cameras.

SUMMARY

In one embodiment, an imaging glove includes a wrist portion, a finger portion extending from the wrist portion, a wrist camera coupled to the wrist portion, a finger camera coupled to the finger portion, a processor communicatively coupled to the wrist camera and the finger camera, a memory module communicatively coupled to the processor, and machine readable instructions stored in the memory module. When executed by the processor, the machine readable instructions cause the imaging glove to receive image data from the wrist camera or the finger camera, recognize an object in the received image data, and provide output indicative of the recognized object.

In another embodiment, an imaging glove includes a wrist portion, a finger portion extending from the wrist portion, a wrist camera coupled to the wrist portion, a finger camera coupled to the finger portion, a processor communicatively coupled to the wrist camera and the finger camera, a memory module communicatively coupled to the processor, and machine readable instructions stored in the memory module. When executed by the processor, the machine readable instructions cause the imaging glove to receive image data from the wrist camera or the finger camera, recognize text in the received image data, and provide output indicative of the recognized text.

In yet another embodiment, an imaging glove includes a wrist portion, a finger portion extending from the wrist portion, a wrist camera coupled to the wrist portion, a finger camera coupled to the finger portion, a proximity sensor coupled to the finger portion, and a temperature sensor coupled to the finger portion. The imaging glove further includes a processor communicatively coupled to the wrist camera, the finger camera, the proximity sensor, and the temperature sensor. The imaging glove further includes a memory module communicatively coupled to the processor, and machine readable instructions stored in the memory module. When executed by the processor, the machine readable instructions cause the imaging glove to receive image data from the wrist camera or the finger camera, recognize an object in the received image data, determine a proximity of the imaging glove to the object, determine a temperature of the object, and provide output indicative of at least one of the recognized object, the determined proximity, and the determined temperature.

These and additional features provided by the embodiments of the present disclosure will be more fully understood in view of the following detailed description, in conjunction with the drawings.

BRIEF DESCRIPTION OF THE DRAWINGS

The embodiments set forth in the drawings are illustrative and exemplary in nature and not intended to limit the disclosure. The following detailed description of the illustrative embodiments can be understood when read in conjunction with the following drawings, where like structure is indicated with like reference numerals and in which.

DETAILED DESCRIPTION

Figure 3:
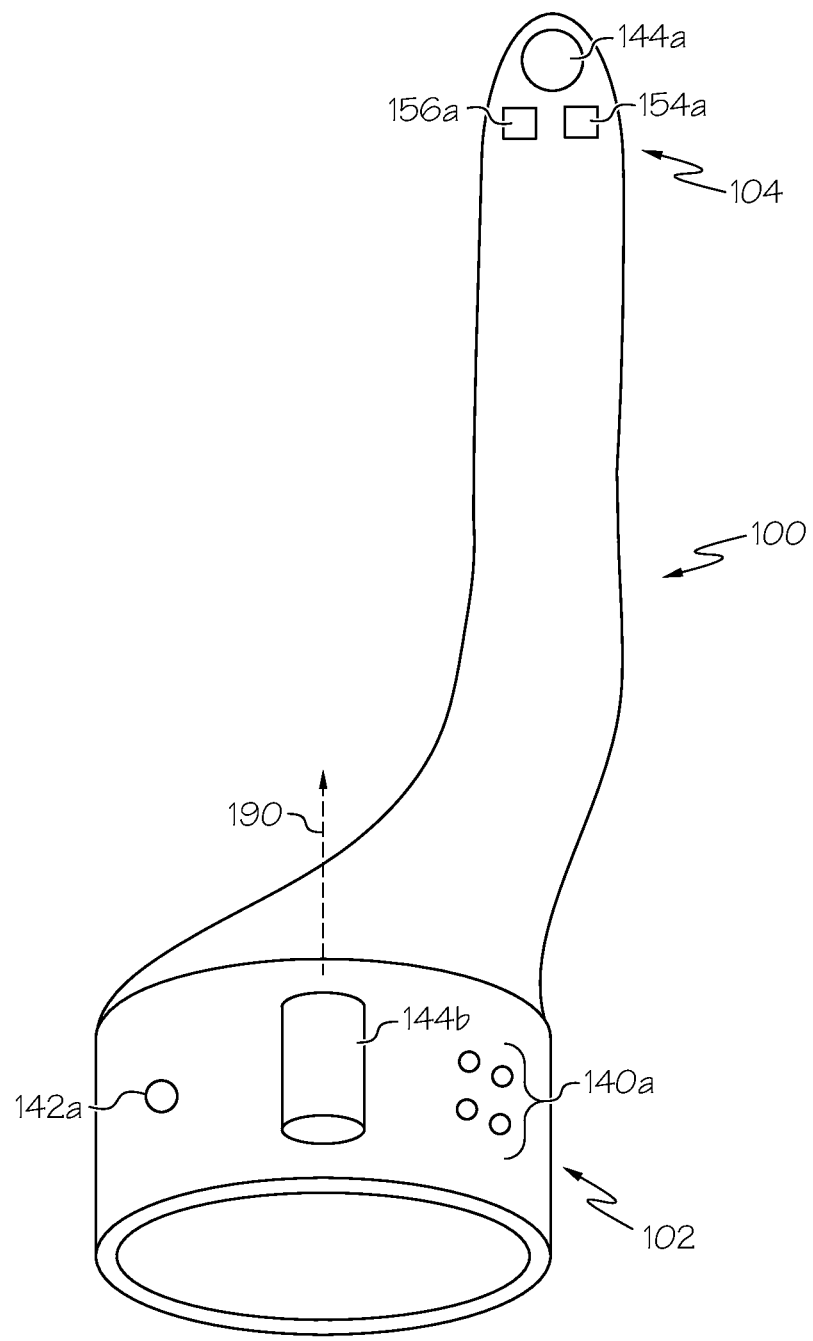
FIG. 3 schematically depicts a bottom view of the imaging glove of FIG. 2, according to one or more embodiments shown and described herein.

The embodiments disclosed herein include imaging gloves including wrist cameras and finger cameras. Referring generally to FIG. 3, an imaging glove includes a wrist portion, a finger portion, a wrist camera coupled to the wrist portion, and a finger camera coupled to the finger portion. The imaging glove may receive image data from the wrist camera or finger camera, recognize an object or text in the received image data, and provide output indicative of the recognized image or the recognized text. The finger camera and the wrist camera may supplement one another as the imaging glove is used. For example, having both a wrist camera and a finger camera may provide redundancy if one of the cameras is occluded or malfunctioning. Some embodiments may utilize the wrist camera for object recognition and the finger camera for text recognition, such as embodiments in which a wrist camera focal point is farther from the wrist camera than a finger camera focal point is from the finger camera. Moreover, the wrist camera and the finger camera may also operate in tandem to recognize text on a page, such as when the wrist camera captures an image of a larger portion of the page and the finger camera adds additional detail to the captured image as the user moves the finger camera over smaller portions of the page. The various imaging gloves including wrist cameras and finger cameras will be described in more detail herein with specific reference to the corresponding drawings.

Figure 1:
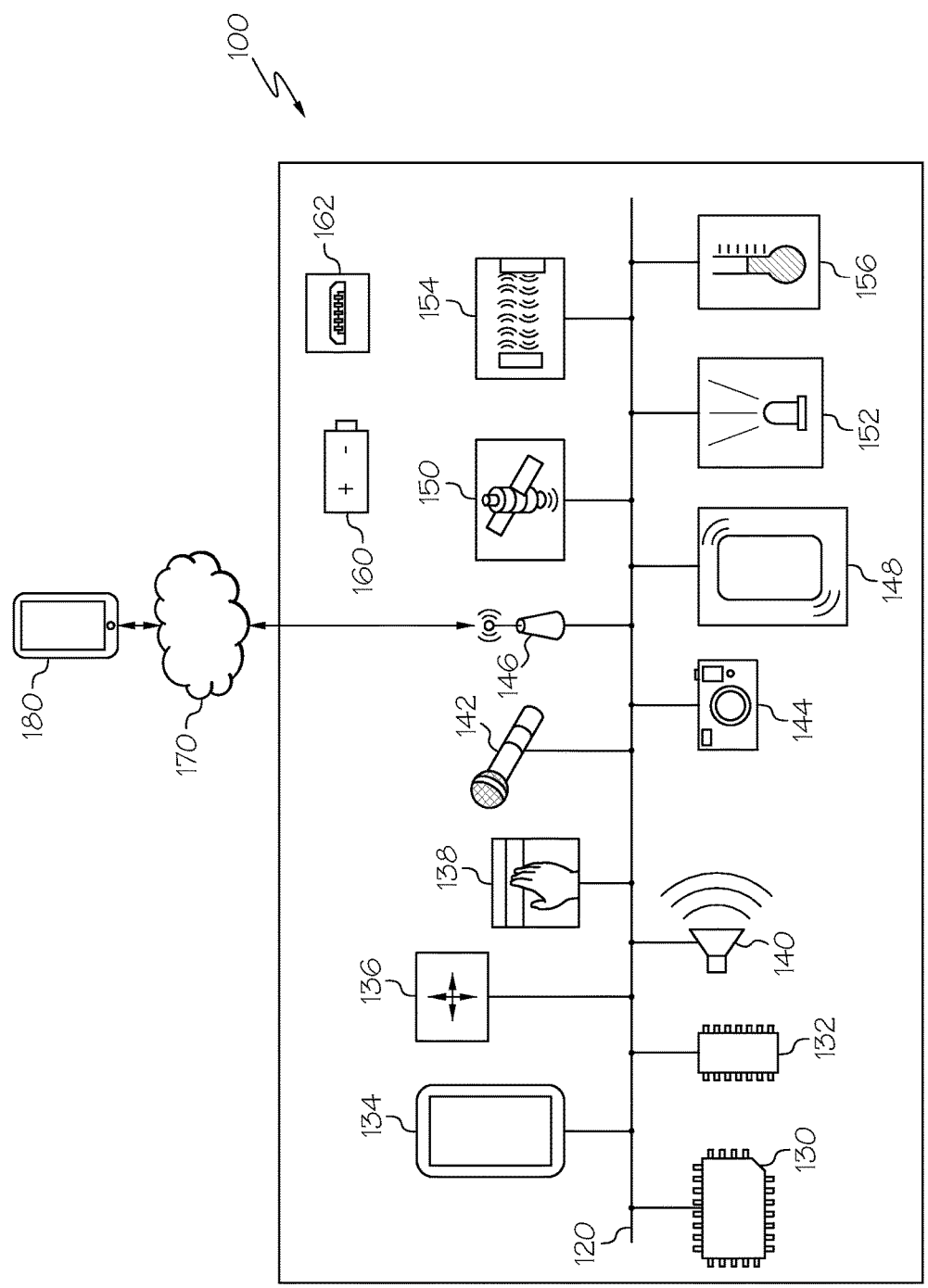
FIG. 1 schematically depicts an imaging glove including a variety of sensors and electronic components, according to one or more embodiments shown and described herein.

Referring now to FIG. 1, one embodiment of an imaging glove 100 is schematically depicted. The imaging glove 100 includes a communication path 120, one or more processors 130, one or more memory modules 132, one or more displays 134, one or more inertial measurement units 136, tactile input hardware 138, one or more speakers 140, one or more microphones 142, one or more cameras 144, network interface hardware 146, one or more tactile feedback devices 148, one or more location sensors 150, one or more lights 152, one or more proximity sensors 154, one or more temperature sensors 156, one or more batteries 160, and one or more charging ports 162. The various components of the imaging glove 100 and the interaction thereof will be described in detail below.

Still referring to FIG. 1, the communication path 120 may be formed from any medium that is capable of transmitting a signal such as, for example, conductive wires, conductive traces, optical waveguides, or the like. Moreover, the communication path 120 may be formed from a combination of mediums capable of transmitting signals. In one embodiment, the communication path 120 comprises a combination of conductive traces, conductive wires, connectors, and buses that cooperate to permit the transmission of electrical data signals to components such as processors, memories, sensors, input devices, output devices, and communication devices. Accordingly, the communication path 120 may comprise a bus. Additionally, it is noted that the term "signal" means a waveform (e.g., electrical, optical, magnetic, mechanical or electromagnetic), such as DC, AC, sinusoidal-wave, triangular-wave, square-wave, vibration, and the like, capable of traveling through a medium. The communication path 120 communicatively couples the various components of the imaging glove 100. As used herein, the term "communicatively coupled" means that coupled components are capable of exchanging data signals with one another such as, for example, electrical signals via conductive medium, electromagnetic signals via air, optical signals via optical waveguides, and the like.

Each of the one or more processors 130 of the imaging glove 100 may be any device capable of executing machine readable instructions. Accordingly, each of the one or more processors 130 may be a controller, an integrated circuit, a microchip, a computer, or any other computing device. Each of the one or more processors 130 is communicatively coupled to the other components of the imaging glove 100 by the communication path 120. Accordingly, the communication path 120 may communicatively couple any number of processors with one another, and allow the components coupled to the communication path 120 to operate in a distributed computing environment. Specifically, each of the components may operate as anode that may send and/or receive data.

Each of the one or more memory modules 132 of the imaging glove 100 is coupled to the communication path 120 and communicatively coupled to the one or more processors 130. Each of the one or more memory modules 132 may comprise RAM, ROM, flash memories, hard drives, or any device capable of storing machine readable instructions such that the machine readable instructions can be accessed and executed by the one or more processors 130. The machine readable instructions may comprise logic or algorithm(s) written in any programming language of any generation (e.g., 1 GL, 2 GL, 3 GL, 4 GL, or 5 GL) such as, for example, machine language that may be directly executed by the one or more processors 130, or assembly language, object-oriented programming (OOP), scripting languages, microcode, etc., that may be compiled or assembled into machine readable instructions and stored in the one or more memory modules 132. Alternatively, the machine readable instructions may be written in a hardware description language (HDL), such as logic implemented via either a field-programmable gate array (FPGA) configuration or an application-specific integrated circuit (ASIC), or their equivalents. Accordingly, the functionality described herein may be implemented in any conventional computer programming language, as pre-programmed hardware elements, or as a combination of hardware and software components.

Each of the one or more displays 134 is coupled to the communication path 120 and communicatively coupled to the one or more processors 130. Each of the one or more displays 134 may be any device capable of providing visual output. Each of the one or more displays 134 may include any medium capable of transmitting an optical output such as, for example, a cathode ray tube, light emitting diodes, a liquid crystal display, a plasma display, or the like. In some embodiments, the one or more displays 134 may include a touchscreen that, in addition to providing optical information, detects the presence and location of a tactile input upon a surface of or adjacent to the display. In such embodiments, the touchscreen may receive mechanical input directly upon the optical output provided by the display. In some embodiments, the one or more displays 134 includes a three dimensional tactile display including a surface, portions of which may raise to communicate information. Additionally, it is noted that each of the one or more displays 134 can include at least one processor or memory module. Some embodiments of the imaging glove 100 may not include the one or more displays 134.

Each of the one or more inertial measurement units 136 is coupled to the communication path 120 and communicatively coupled to the one or more processors 130. Each of the one or more inertial measurement units 136 may include one or more accelerometers and one or more gyroscopes. Each of the one or more inertial measurement units 136 transforms sensed physical movement of the imaging glove 100 into a signal indicative of an orientation, a rotation, a velocity, or an acceleration of the imaging glove 100. Some embodiments of the imaging glove 100 may not include the one or more inertial measurement units 136, such as embodiments that include an accelerometer but not a gyroscope, embodiments that include a gyroscope but not an accelerometer, or embodiments that include neither an accelerometer nor a gyroscope.

Still referring to FIG. 1, the tactile input hardware 138 is coupled to the communication path 120 and communicatively coupled to the one or more processors 130. The tactile input hardware 138 may be any device capable of transforming mechanical pressure (e.g, the pressure from a user contacting the tactile input hardware 138) into a data signal that can be transmitted over the communication path 120 such as, for example, a button, a switch, a knob, a microphone or the like. In some embodiments, the tactile input hardware 138 includes a power button, a volume button, an activation button, a scroll button, or the like. In some embodiments, the tactile input hardware 138 includes a pressure sensor, a touch strip, a pressure strip, or the like. Some embodiments may not include the tactile input hardware 138.

Each of the one or more speakers 140 is coupled to the communication path 120 and communicatively coupled to the one or more processors 130. Each of the one or more speakers 140 transforms data signals from the imaging glove 100 into audible mechanical vibrations. However, it should be understood that in other embodiments the imaging glove 100 may not include the one or more speakers 140.

Each of the one or more microphones 142 is coupled to the communication path 120 and communicatively coupled to the one or more processors 130. Each of the one or more microphones 142 may be any device capable of transforming a mechanical vibration associated with sound into an electrical signal indicative of the sound. Some embodiments may not include the one or more microphones 142.

Each of the one or more cameras 144 is coupled to the communication path 120 and communicatively coupled to the one or more processors 130. Each of the one or more cameras 144 may be any device having an array of sensing devices (e.g., pixels) capable of detecting radiation in an ultraviolet wavelength band, a visible light wavelength band, or an infrared wavelength band. Each of the one or more cameras 144 may have any resolution. The one or more cameras 144 may include an omni-directional camera, or a panoramic camera. In some embodiments, one or more optical components, such as a minor, fish-eye lens, or any other type of lens may be optically coupled to at least one of the one or more cameras 144.

The network interface hardware 146 is coupled to the communication path 120 and communicatively coupled to the one or more processors 130. The network interface hardware 146 may be any device capable of transmitting and/or receiving data via a network 170. Accordingly, the network interface hardware 146 can include a communication transceiver for sending and/or receiving any wired or wireless communication. For example, the network interface hardware 146 may include an antenna, a modem, LAN port, Wi-Fi card, WiMax card, mobile communications hardware, near-field communication hardware, satellite communication hardware and/or any wired or wireless hardware for communicating with other networks and/or devices. In some embodiments, the network interface hardware 146 includes hardware configured to operate in accordance with the Bluetooth wireless communication protocol. In some embodiments, the network interface hardware 146 may include a Bluetooth send/receive module for sending and receiving Bluetooth communications to/from a portable electronic device 180.

Still referring to FIG. 1, in some embodiments, the imaging glove 100 may be communicatively coupled to a portable electronic device 180 via the network 170. In some embodiments, the network 170 is a personal area network that utilizes Bluetooth technology to communicatively couple the imaging glove 100 and the portable electronic device 180. In other embodiments, the network 170 may include one or more computer networks (e.g., a personal area network, a local area network, or a wide area network), cellular networks, satellite networks and/or a global positioning system and combinations thereof. Accordingly, the imaging glove 100 can be communicatively coupled to the network 170 via wires, via a wide area network, via a local area network, via a personal area network, via a cellular network, via a satellite network, or the like. Suitable local area networks may include wired Ethernet and/or wireless technologies such as, for example, wireless fidelity (Wi-Fi). Suitable personal area networks may include wireless technologies such as, for example, IrDA, Bluetooth, Wireless USB, Z-Wave, ZigBee, and/or other near field communication protocols. Suitable personal area networks may similarly include wired computer buses such as, for example, USB and FireWire. Suitable cellular networks include, but are not limited to, technologies such as LTE, WiMAX, UMTS, CDMA, and GSM.

As stated above, the network 170 may be utilized to communicatively couple the imaging glove 100 with the portable electronic device 180. The portable electronic device 180 may include a mobile phone, a smartphone, a personal digital assistant, a camera, a dedicated mobile media player, a mobile personal computer, a laptop computer, a smart watch, and/or any other portable electronic device capable of being communicatively coupled with the imaging glove 100. The portable electronic device 180 may include one or more processors and one or more memories. The one or more processors can execute logic to communicate with the imaging glove 100. The portable electronic device 180 may be configured with wired and/or wireless communication functionality for communicating with the imaging glove 100. In some embodiments, the portable electronic device 180 may perform one or more elements of the functionality described herein, such as in embodiments in which the functionality described herein is distributed between the imaging glove 100 and the portable electronic device 180.

Still referring to FIG. 1, each of the one or more tactile feedback devices 148 is coupled to the communication path 120 and communicatively coupled to the one or more processors 130. Each of the one or more tactile feedback devices 148 may be any device capable of providing tactile feedback to a user. The one or more tactile feedback devices 148 may include a vibration device (such as in embodiments in which tactile feedback is delivered through vibration), an air blowing device (such as in embodiments in which tactile feedback is delivered through a puff of air), or a pressure generating device (such as in embodiments in which the tactile feedback is delivered through generated pressure). Some embodiments may not include the one or more tactile feedback devices 148.

Each of the one or more location sensors 150 is coupled to the communication path 120 and communicatively coupled to the one or more processors 130. Each of the one or more location sensors 150 may be any device capable of generating an output indicative of a location. In some embodiments, the one or more location sensors 150 include a global positioning system (GPS) sensor, though embodiments are not limited thereto. Some embodiments may not include the one or more location sensors 150, such as embodiments in which the imaging glove 100 does not determine a location of the imaging glove 100 or embodiments in which the location is determined in other ways (e.g., based on information received from the one or more cameras 144, the one or more microphones 142, the network interface hardware 146, the one or more proximity sensors 154, the one or more inertial measurement units 136 or the like).

Each of the one or more lights 152 is coupled to the communication path 120 and communicatively coupled to the one or more processors 130. Each of the one or more lights 152 may be any device capable of outputting light, such as but not limited to a light emitting diode, an incandescent light, a fluorescent light, or the like. In some embodiments, the one or more lights 152 include a power indicator light that is illuminated when the imaging glove 100 is powered on. In some embodiments, the one or more lights 152 includes an activity indicator light that is illuminated when the imaging glove 100 is active or processing data. In some embodiments, the one or more lights 152 includes an illumination light for illuminating a field proximate the imaging glove 100. Some embodiments may not include the one or more lights 152, such as embodiments in which visual output is provided via the one or more displays 134, or embodiments in which no light output is provided.

Each of the one or more proximity sensors 154 is coupled to the communication path 120 and communicatively coupled to the one or more processors 130. Each of the one or more proximity sensors 154 may be any device capable of outputting a proximity signal indicative of a proximity of the imaging glove 100 to another object. In some embodiments, the one or more proximity sensors 154 may include a laser scanner, a capacitive displacement sensor, a Doppler effect sensor, an eddy-current sensor, an ultrasonic sensor, a magnetic sensor, an optical sensor, a radar sensor, a sonar sensor, or the like. Some embodiments may not include the one or more proximity sensors 154, such as embodiments in which the proximity of the imaging glove 100 to an object is determine from inputs provided by other sensors (e.g., the one or more cameras 144, the one or more speakers 140, etc.) or embodiments that do not determine a proximity of the imaging glove 100 to an object.

Each of the one or more temperature sensors 156 is coupled to the communication path 120 and communicatively coupled to the one or more processors 130. Each of the one or more temperature sensors 156 may be any device capable of outputting a temperature signal indicative of a temperature sensed by the one or more temperature sensors 156. In some embodiments, the one or more temperature sensors 156 may include a thermocouple, a resistive temperature device, an infrared sensor, a bimetallic device, a change of state sensor, a thermometer, a silicon diode sensor, or the like. Some embodiments of the imaging glove 100 may not include the one or more temperature sensors 156.

The imaging glove 100 is powered by the one or more batteries 160, each of which is electrically coupled to the various electrical components of the imaging glove 100. Each of the one or more batteries 160 may be any device capable of storing electric energy for later use by the imaging glove 100. In some embodiments, the one or more batteries 160 may include a rechargeable battery, such as a lithium-ion battery or a nickel-cadmium battery. In embodiments in which the one or more batteries 160 include a rechargeable battery, the imaging glove 100 may include the one or more charging ports 162, each of which may be used to charge the one or more batteries 160. Some embodiments may not include the one or more batteries 160, such as embodiments in which the imaging glove 100 is powered by solar energy or energy harvested from the environment. Some embodiments may not include the one or more charging ports 162, such as embodiments in which the imaging glove 100 utilizes disposable batteries for power.

Figure 2:
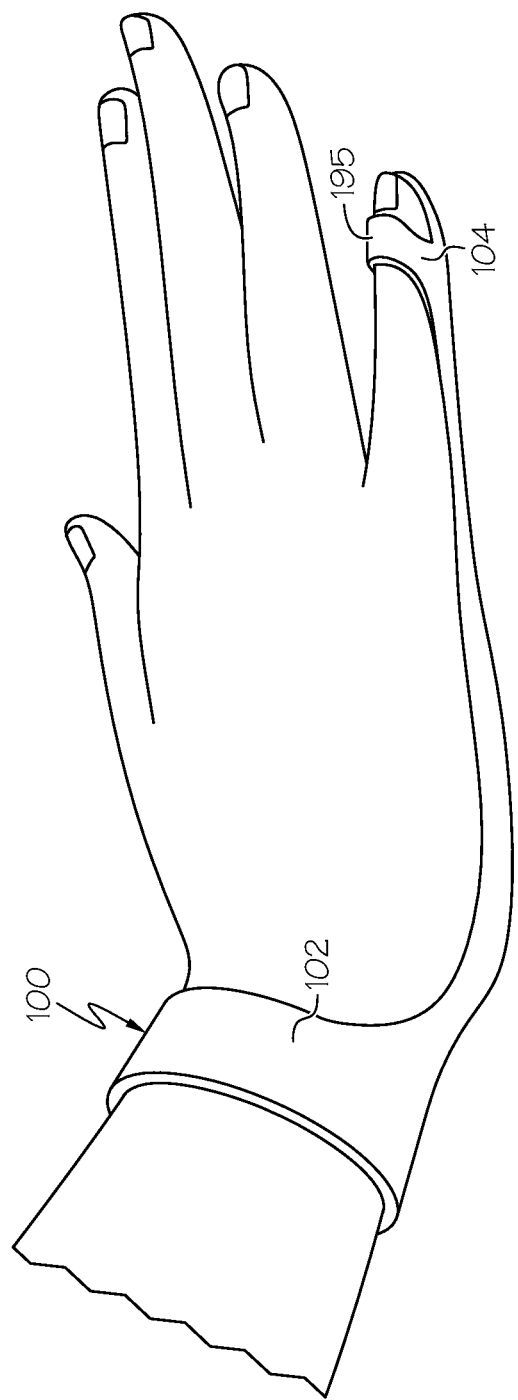
FIG. 2 schematically depicts a perspective view of an imaging glove being worn on a hand of a user, according to one or more embodiments shown and described herein.

The imaging glove 100 is a wearable imaging glove that may be worn by a user and utilized by the user to recognize objects or text, as will be explained in detail below. By way of non-limiting example, FIG. 2 depicts the imaging glove 100 worn on the hand of a user. Referring to FIG. 2, the imaging glove 100 includes a wrist portion 102 and a finger portion 104 extending from the wrist portion. The finger portion 104 is secured to a finger of the user with a strap 195. In the embodiment depicted in FIG. 2, the finger portion 104 is a pinky portion configured to be coupled to a pinky finger of a user when the user wears the imaging glove 100. In some embodiments, the finger portion 104 may be configured to be coupled to a finger of the user other than the pinky finger. In some embodiments, the imaging glove 100 may include multiple finger portions, each of which may be coupled to a different finger of the user. In some embodiments, the imaging glove 100 is formed from neoprene, while in other embodiments the imaging glove 100 is formed form other materials. In some embodiments, the imaging glove 100 and its electronic components are washable.

In some embodiments, the imaging glove 100 is configured such that when the imaging glove 100 is worn on a hand of a user, a portion of at least one finger of the user is exposed. For example, in the embodiment depicted in FIG. 2, the finger tips of all of the user's fingers other than the pinky finger that is coupled to the finger portion 104 are exposed. In some embodiments, the finger portion 104 may not completely cover the finger of the user that is coupled to the finger portion 104, such as in embodiments in which the finger portion 104 is configured to extend partially relative to the user's finger such that the finger portion 104 does not cover the finger tip when the user wears the imaging glove 100. Imaging gloves that do not leave one or more finger tips of the user exposed when the user wears the imaging glove may inhibit the user's ability to interact with and sense the physical environment with his or her fingers because fingers covered by the imaging glove will likely have reduced sensitivity. By leaving one or more of the user's finger tips exposed when the user wears the imaging glove 100, the user may utilize the exposed finger tips to sense or interact with the environment, such as by using the exposed finger tips to feel the texture of surfaces.

Referring now to FIG. 3, a bottom view of the imaging glove 100 of FIG. 2 is schematically depicted. The imaging glove 100 includes a wrist portion 102, a speaker 140a, a wrist camera 144b, a microphone 142a, a finger portion 104, a proximity sensor 154a, a finger camera 144a, and a temperature sensor 156a. The finger portion 104 extends from the wrist portion 102 and is configured to be coupled to a finger of a user when the user wears the imaging glove 100.

Still referring to FIG. 3, the wrist camera 144b is coupled to the wrist portion 102. The wrist camera 144b depicted in FIG. 3 has an optical axis 190 that extends toward a palm of a user wearing the imaging glove 100 such that when the imaging glove 100 is placed on a hand of a user, the wrist camera 144b images an area above a palm of the hand so that an object held in the hand of the user may be imaged by the wrist camera 144b. Quick object recognition of an object held in the user's hand may be facilitated by orienting the wrist camera 144b such that the optical axis 190 is directed toward a palm of a user wearing the imaging glove 100. The wrist camera 144b is included in the one or more cameras 144 described above with respect to FIG. 1. While the embodiment depicted in FIG. 3 includes only one wrist camera 144b, other embodiments may include more than one wrist camera, such as embodiments that include two wrist cameras that provide a stereoscopic viewing system for objects imaged by the wrist cameras. Furthermore, while the wrist camera 144b is positioned in a center of the wrist portion 102 in the embodiment depicted in FIG. 3, in other embodiments, the wrist camera 144b may be offset from the center.

Still referring to FIG. 3, the finger camera 144a is coupled to the finger portion 104. In some embodiments, the finger camera 144a is recessed in the finger portion 104 such that the finger camera 144a may avoid damage or contamination when a user contacts a surface with the finger portion 104. In some embodiments, the finger camera 144a has a close focal point such that the finger camera 144a may capture close text and image information. For example, in some embodiments a first distance between a finger camera focal point and the finger camera 144a is smaller than a second distance between a wrist camera focal point and the wrist camera 144b. In some embodiments, the finger camera 144a may be configured to be detached from the finger portion 104 and interchanged with another finger camera, such as when the finger camera 144a becomes damaged or malfunctions. The finger camera 144a is included in the one or more cameras 144 described above with respect to FIG. 1. While the embodiment depicted in FIG. 3 includes only one finger camera 144a, other embodiments may include more than one finger camera, such as embodiments that include two finger cameras that provide a stereoscopic viewing system for objects imaged by the finger cameras. Furthermore, while the finger camera 144a is positioned at an end of the finger portion 104 in the embodiment depicted in FIG. 3, in other embodiments, the finger camera 144a may not be so positioned.

The finger camera 144a and the wrist camera 144b may supplement one another as the imaging glove 100 is used. For example, in some embodiments, the wrist camera 144b may provide redundancy if the finger camera 144a is occluded or malfunctioning. Similarly, the finger camera 144a may provide redundancy if the wrist camera 144b is occluded or malfunctioning. As another non-limiting example, the wrist camera 144b and the finger camera 144a may operate in tandem to recognize text on a page, such as when the wrist camera 144b captures an image of a larger portion of the page and the finger camera 144a adds additional detail to the captured image as the user moves the finger camera 144a over smaller portions of the page (e.g., by tracing lines on the page).

Still referring to FIG. 3, the speaker 140a is coupled to the wrist portion 102. In other embodiments, the speaker 140a may be coupled to the finger portion 104 or another portion of the imaging glove 100. The speaker 140a transforms data signals from the imaging glove 100 into audible output, such as audible output indicative of text or objects recognized by the imaging glove 100. The speaker 140a is included in the one or more speakers 140 described above with respect to FIG. 1.

Still referring to FIG. 3, the microphone 142a is coupled to the wrist portion 102. In other embodiments, the microphone 142a may be coupled to the finger portion 104 or another portion of the imaging glove 100. The microphone 142a transforms mechanical vibration associated with sound into an electrical signal indicative of the sound. In some embodiments, the microphone 142a may be used by a user to interact with the imaging glove 100, such as in embodiments in which a user may issue verbal commands to the imaging glove 100 to control the device. The microphone 142a is included in the one or more microphones 142 described above with respect to FIG. 1.

Still referring to FIG. 3, the proximity sensor 154a is coupled to the finger portion 104. The proximity sensor 154a outputs a proximity signal indicative of a proximity of the imaging glove 100 to an object. When executed by the one or more processors 130, the machine readable instructions stored in the one or more memory modules 132 may cause the imaging glove 100 to determine a proximity of the imaging glove 100 to the object and provide output indicative of the determined proximity, such as by providing audible output with the speaker 140a (e.g., "your hand is near a wall") or tactile feedback (e.g., vibration) with the one or more tactile feedback devices 148 indicative that an object is close. The proximity sensor 154a is positioned at an end of the finger portion 104 to facilitate sensing of the proximity of objects near the finger tip of the user. However, in other embodiments, the proximity sensor 154a may not be positioned at the end of the finger portion 104, such as in embodiments in which the proximity sensor 154a is positioned on the wrist portion 102 or embodiments that do not include the proximity sensor 154a.

Still referring to FIG. 3, the temperature sensor 156a is coupled to the finger portion 104. The temperature sensor 156a outputs a temperature signal indicative of a temperature of a surface near the imaging glove 100. When executed by the one or more processors 130, the machine readable instructions stored in the one or more memory modules 132 may cause the imaging glove 100 to determine a temperature of the object and provide output indicative of the determined proximity, such as by providing audible output with the speaker 140a (e.g., "hot surface!") or tactile feedback (e.g., vibration) with the one or more tactile feedback devices 148 indicative of a hot surface. The temperature sensor 156a is positioned at an end of the finger portion 104 to facilitate sensing of the temperature of objects or surfaces near the finger tip of the user. However, in other embodiments, the temperature sensor 156a may not be positioned at the end of the finger portion 104, such as in embodiments in which the temperature sensor 156a is positioned on the wrist portion 102 or embodiments that do not include the temperature sensor 156a.

The one or more processors 130, the one or more memory modules 132, and the network interface hardware 146 (FIG. 1) may also be coupled to the wrist portion 102. For example, in the embodiment depicted in FIG. 3, the one or more processors 130, the one or more memory modules 132, and the network interface hardware 146 are not shown because they are housed within the wrist portion 102.

It should be understood that in other embodiments, the imaging glove 100 depicted in FIG. 3 may have a different configuration or layout of components. In some embodiments, the imaging glove 100 may not include at least one of the depicted components. In some embodiments, the imaging glove 100 may include other components than depicted in FIG. 3, such as embodiments that include other components described above with respect to FIG. 1, such as the one or more displays 134, the one or more inertial measurement units 136, the tactile input hardware 138, the one or more tactile feedback devices 148, the one or more location sensors 150, the one or more lights 152, or the like. For example, some embodiments may include tactile input hardware 138, such as a pressure sensor or touch strip positioned at an end of the finger portion 104, which may detect a surface contacted by the tactile input hardware 138.

By way of non-limiting example, the imaging glove 100 may be used to recognize text or objects in a user's environment and provide output (e.g., audible output provided by the speaker 140a, output transmitted to a paired portable electronic device, tactile feedback provided by the one or more tactile feedback devices 148, etc.) in response to recognizing the text or objects. For example, a visually impaired user may utilize the imaging glove 100 to read aloud text imaged from a surface. A visually impaired user may also utilize the imaging glove 100 to provide output pertaining to objects recognized by the imaging glove 100 or an environment imaged by the imaging glove 100. However, uses of the imaging glove 100 are not limited to applications for visually impaired individuals. For example, the imaging glove 100 may be used by a user having normal vision to translate imaged text that is in a language other than the user can comprehend by: imaging the text, and providing an audible translation of the text in a language that the user can comprehend.

In operation, a user may utilize the imaging glove 100 to image a field of view of the finger camera 144a and/or the wrist camera 144b, which may include text or an environment including one or more objects. With respect to objects in the user's environment, the user may utilize the imaging glove 100 to recognize a variety of classes of objects including, but not limited to, people, tables, empty seats, doorways, walls, restrooms, and water fountains. The imaging glove 100 may receive image data from the finger camera 144a or the wrist camera 144b. The image data may be received by the one or more processors 130, which may process the image data using one or more algorithms. Any known or yet-to-be developed optical character recognition algorithms may be applied to the image data in order to recognize text included in the image data. One or more object recognition algorithms may be applied to the image data to extract objects. Any known or yet-to-be-developed object recognition algorithms may be used to extract the objects from the image data. Example object recognition algorithms include, but are not limited to, scale-invariant feature transform ("SIFT"), speeded up robust features ("SURF"), and edge-detection algorithms. Any known or yet-to-be developed facial recognition algorithms may also be applied to the image data to detect particular people within the environment. The optical character recognition algorithms, object recognition algorithms, or facial recognition algorithms may be stored in the one or more memory modules 132 and executed by the one or more processors 130.

Figure 4:
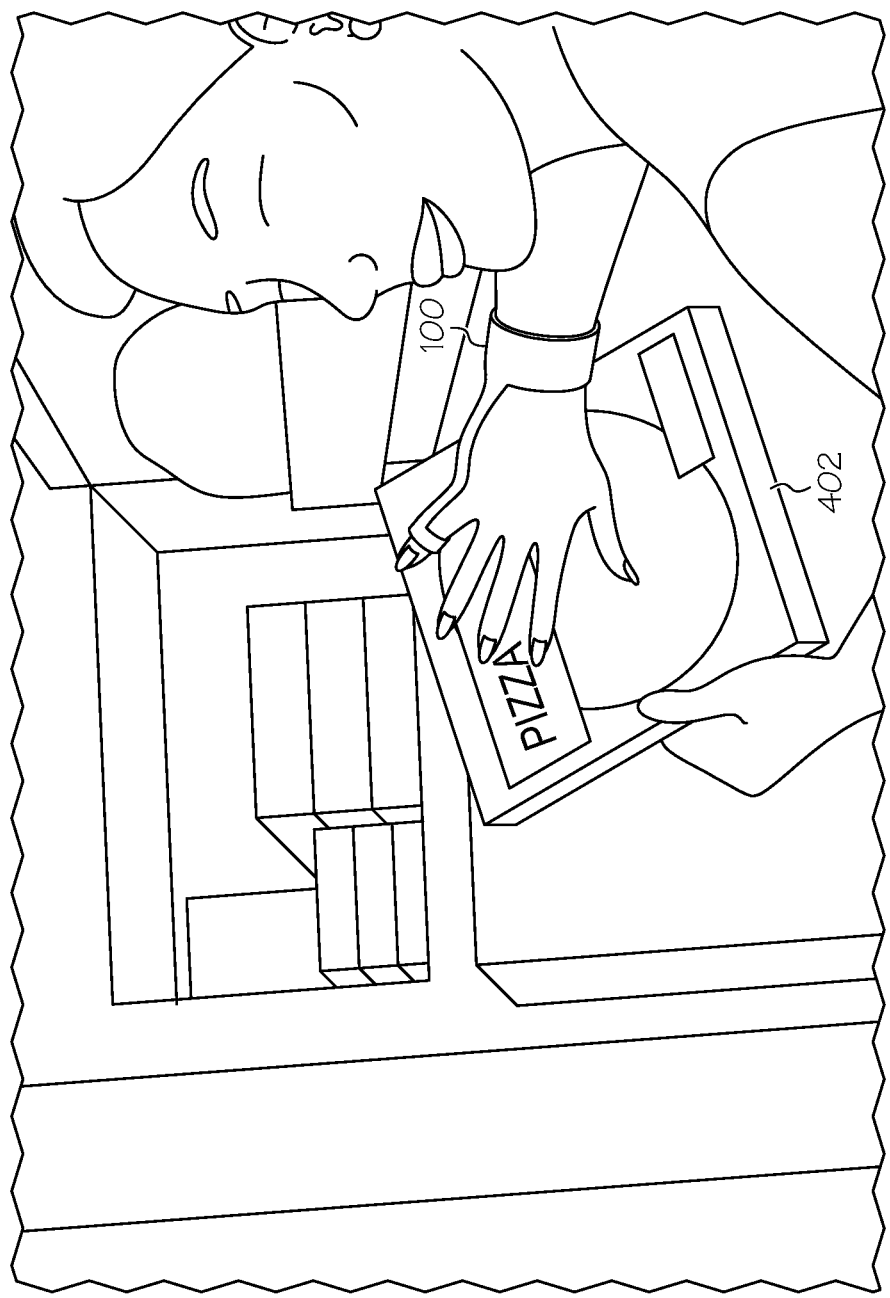
FIG. 4 schematically depicts an imaging glove imaging a pizza box, according to one or more embodiments shown and described herein.

A non-limiting example use case of a visually impaired user using the imaging glove 100 to locate a pizza box and receive preparation instructions for the pizza will now be described with reference to FIGS. 4-6. Referring now to FIG. 4, a user may desire to eat pizza and may retrieve a pizza box 402 from a freezer. In order to verify that the user has in fact retrieved the pizza box, the user may use the imaging glove 100 to image the pizza box 402. For example, the imaging glove 100 may receive image data from the wrist camera 144b, recognize an object (in this case, the pizza box 402) in the received image data with one or more of object recognition algorithms executed by the one or more processors 130, and provide output indicative of the recognized object. As noted above, the wrist camera 144b may be better suited for object recognition than the finger camera 144a when the wrist camera 144b has a farther focal point and/or a wider field of view than the finger camera 144a. However, in other embodiments, the imaging glove 100 may receive image data from the finger camera 144a, or may receive image data from both the wrist camera 144b and the finger camera 144a.

After recognizing the pizza box, the imaging glove 100 may provide output indicative of the recognized object. In some embodiments, the imaging glove 100 may provide audible output indicative of the recognized object, such as by outputting "you are holding a pizza box," (FIG. 5) via the speaker 140a of the imaging glove 100 to indicate to the visually impaired user that he or she is holding a pizza box. In some embodiments, the imaging glove 100 may transmit the output indicative of the recognized object to a portable electronic device. For example, the imaging glove 100 may transmit data indicative of the recognized object to the portable electronic device 180 via the network 170 (FIG. 1). The portable electronic device 180 may utilize the data for a variety of purposes, such as for retrieving preparation instructions for the pizza in the recognized pizza box and transmitting the preparation instructions to the imaging glove 100 to be output through the speaker 140a. In some embodiments, the imaging glove 100 may transmit a message to a headset paired to the imaging glove 100 via the network interface hardware 146 that causes the headset to generate audible output, such as the "you are holding a pizza box" message described above. In some embodiments, the functionality described herein, such as the object recognition and image processing features may distributed among the imaging glove 100 and the portable electronic device 180.

Figure 6:
FIG. 6 schematically depicts an imaging glove imaging preparation instructions on a pizza box, according to one or more embodiments shown and described herein.

Referring to FIG. 6, in embodiments that do not receive preparation instructions from the portable electronic device 180, the user may use the imaging glove 100 to image a back surface 600 of the pizza box 402 to ascertain preparation instructions for the pizza. The imaging glove 100 may receive image data from the finger camera 144a, recognize text (in this case, the preparation instructions) in the received image data with one or more of optical character recognition algorithms executed by the one or more processors 130, and provide output indicative of the recognized text. As noted above, the finger camera 144a may be better suited for text recognition than the wrist camera 144b when the finger camera 144a has a shorter focal point better suited for imaging closer surfaces or objects. However, in other embodiments, the imaging glove 100 may receive image data from the wrist camera 144b, or may receive image data from both the wrist camera 144b and the finger camera 144a.

After recognizing the text for the preparation instructions, the imaging glove 100 may provide output indicative of the recognized text. In some embodiments, the imaging glove 100 may provide audible output indicative of the recognized text, such as by outputting "preheat the oven to 400 degrees, then bake for 13 to 15 minutes," (FIG. 5) via the speaker 140a of the imaging glove 100 to provide the preparation instructions to the visually impaired user. In some embodiments, the imaging glove 100 may transmit the output indicative of the recognized text to a portable electronic device. In some embodiments, the functionality described herein, such as the text recognition and image processing features may distributed among the imaging glove 100 and the portable electronic device 180.

Figure 5:
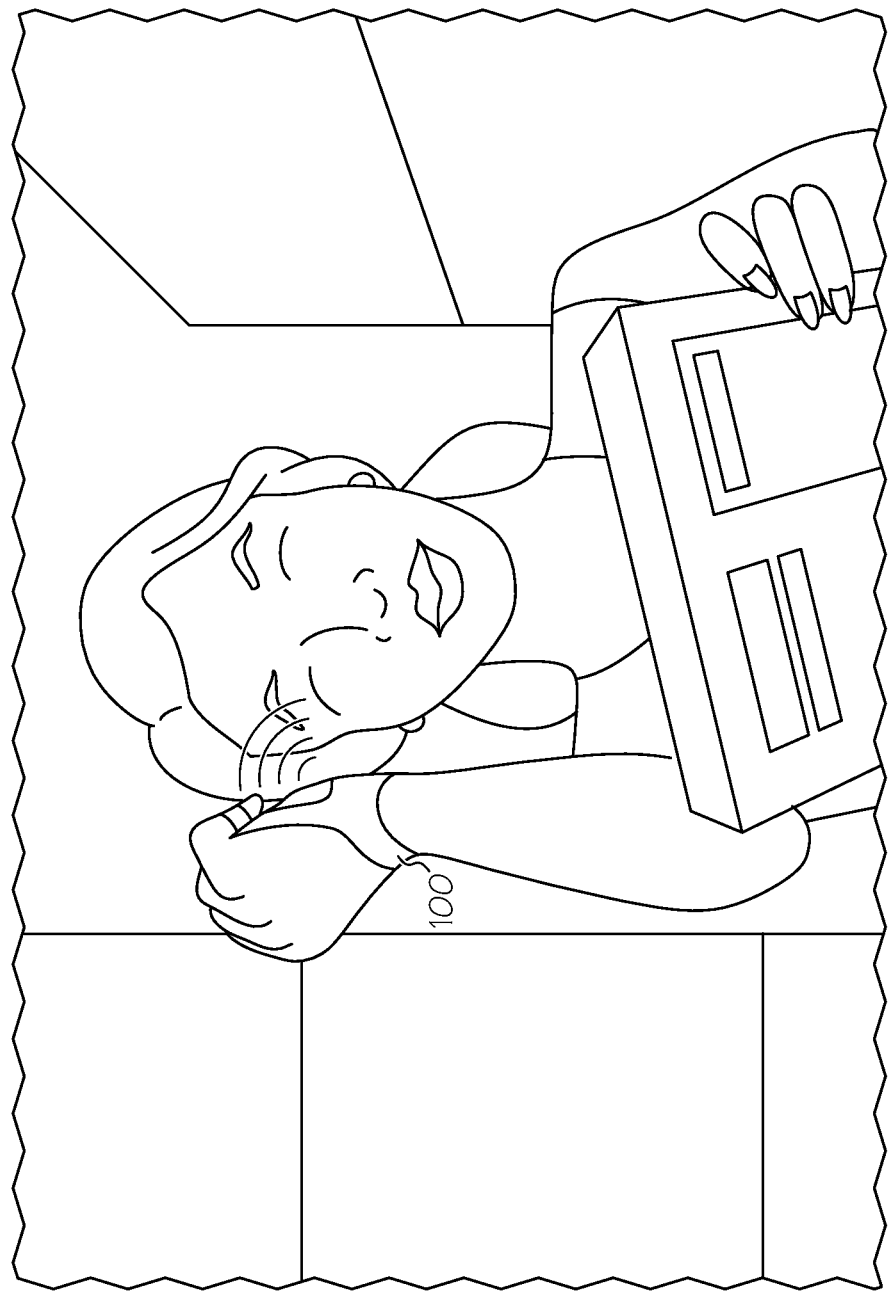
FIG. 5 schematically depicts an imaging glove providing audible output to a user, according to one or more embodiments shown and described herein.

While the imaging glove 100 was described in the context of recognition of a pizza box and recognition of preparation instruction text with reference to FIGS. 4-6, embodiments are not limited thereto. For example, the imaging glove 100 may be used to recognize objects in a user's environment or to provide output pertaining to the environment. In such embodiments, the imaging glove 100 may receive image data from at least one of the wrist camera 144b and the finger camera 144a, recognize an object included in the received image data, and provide output indicative of the recognized object. The output may include spatial information regarding objects that are in the user's environment as extracted from the image data. The output may indicate the presence and position of particular objects, such as empty seats, doorways, tables, people, and the like. By way of non-limiting example, the output may include the number of empty seats in the room, the presence of a particular person in a room, or the like. In some embodiments, the optical character recognition algorithms may be used to detect text on signs or other objects in a user's environment. By way of non-limiting example, image data of a user's environment captured by the camera may include an "EXIT" sign. The one or more processors 130 may detect and extract the word and location of the "EXIT" sign in the environment and provide audible output that the exit sign was detected.

Referring once again to FIG. 1, in some embodiments that include the one or more inertial measurement units 136, the one or more inertial measurement units 136 may be used for gesture-based control of the imaging glove 100, such as by activating or deactivating the imaging glove 100 in response to input received from the one or more inertial measurement units 136, or changing the functionality of the imaging glove 100 in response to input received from the one or more inertial measurement units 136. In other embodiments, gesture-based control may be achieved through images of gestures received by the finger camera 144a or the wrist camera 144b.

Still referring to FIG. 1, in some embodiments, the imaging glove 100 may also provide navigational assistance to a user. For example, the imaging glove 100 may determine a location of the user in an environment (e.g., based on information received from the one or more location sensors 150, image data received from the one or more cameras 144, or the like), and generate a path for a user to traverse. In some embodiments, the imaging glove 100 may access map data (e.g., data relating to external maps, such as roads, footpaths, buildings, or the like) stored in the one or more memory modules 132 in order to generate the path. The imaging glove 100 may then provide audible output via the one or more speakers 140 and/or the one or more tactile feedback devices 148 to guide the user along the determined path. For example, the imaging glove 100 may provide audible output with respect to upcoming turns, distance to travel in a forward direction before the next turn, obstacles, hazards, landmarks, or the like.

It should be understood that embodiments described herein are directed to imaging gloves including wrist cameras and finger cameras. The finger camera and the wrist camera may supplement one another as the imaging glove is used. For example, having both a wrist camera and a finger camera may provide redundancy if one of the cameras is occluded or malfunctioning. Some embodiments may utilize the wrist camera for object recognition and the finger camera for text recognition, such as embodiments in which a wrist camera focal point is farther from the wrist camera than a finger camera focal point is from the finger camera. Moreover, the wrist camera and the finger camera may also operate in tandem to recognize text on a page, such as when the wrist camera captures an image of a larger portion of the page and the finger camera adds additional detail to the captured image as the user moves the finger camera over smaller portions of the page.

It is noted that the terms "substantially" and "about" may be utilized herein to represent the inherent degree of uncertainty that may be attributed to any quantitative comparison, value, measurement, or other representation. These terms are also utilized herein to represent the degree by which a quantitative representation may vary from a stated reference without resulting in a change in the basic function of the subject matter at issue.

While particular embodiments have been illustrated and described herein, it should be understood that various other changes and modifications may be made without departing from the spirit and scope of the claimed subject matter. Moreover, although various aspects of the claimed subject matter have been described herein, such aspects need not be utilized in combination. It is therefore intended that the appended claims cover all such changes and modifications that are within the scope of the claimed subject matter.

What is claimed is:

1. An imaging glove comprising:
   a wrist portion;
   a finger portion extending from the wrist portion;
   a wrist camera coupled to the wrist portion;
   a finger camera coupled to the finger portion;
   a processor communicatively coupled to the wrist camera and the finger camera;
   a memory module communicatively coupled to the processor; and
   machine readable instructions stored in the memory module that cause the imaging glove to perform at least the following when executed by the processor:
   receive image data from the wrist camera or the finger camera;
   recognize an object in the received image data; and
   provide output indicative of the recognized object,
   wherein the wrist camera is pointed toward a palm of the imaging glove, and
   wherein a first distance between a finger camera focal point and the finger camera is smaller than a second distance between a wrist camera focal point and the wrist camera.

2. The imaging glove of claim 1, further comprising a speaker communicatively coupled to the processor, wherein the machine readable instructions, when executed by the processor, cause the speaker to provide audible output indicative of the recognized object.

3. The imaging glove of claim 1, further comprising network interface hardware communicatively coupled to the processor, wherein the machine readable instructions, when executed by the processor, cause the network interface hardware to transmit the output indicative of the recognized object to a portable electronic device.

4. The imaging glove of claim 1, wherein the finger camera is recessed in the finger portion.

5. The imaging glove of claim 1, wherein the finger portion is a pinky portion configured to be coupled to a pinky finger of a user when the user wears the imaging glove.

6. The imaging glove of claim 1, further comprising a proximity sensor coupled to the finger portion, wherein the machine readable instructions, when executed by the processor, cause the imaging glove to:
   determine a proximity of the imaging glove to the object; and
   provide output indicative of the determined proximity.

7. The imaging glove of claim 1, further comprising a temperature sensor coupled to the finger portion, wherein the machine readable instructions, when executed by the processor, cause the imaging glove to:
   determine a temperature of the object; and
   provide output indicative of the determined temperature.

8. The imaging glove of claim 1, wherein the imaging glove is configured such that when the imaging glove is worn on a hand of a user, a portion of at least one finger of the user is exposed.

9. An imaging glove comprising:
   a wrist portion;
   a finger portion extending from the wrist portion;
   a wrist camera coupled to the wrist portion;
   a finger camera coupled to the finger portion;
   a processor communicatively coupled to the wrist camera and the finger camera;
   a memory module communicatively coupled to the processor; and
   machine readable instructions stored in the memory module that cause the imaging glove to perform at least the following when executed by the processor:
   receive image data from the wrist camera or the finger camera;
   recognize text in the received image data; and
   provide output indicative of the recognized text,
   wherein the wrist camera is pointed toward a palm of the imaging glove, and
   wherein a first distance between a finger camera focal point and the finger camera is smaller than a second distance between a wrist camera focal point and the wrist camera.

10. The imaging glove of claim 9, further comprising a speaker communicatively coupled to the processor, wherein the machine readable instructions, when executed by the processor, cause the speaker to provide audible output indicative of the recognized text.

11. The imaging glove of claim 9, further comprising network interface hardware communicatively coupled to the processor, wherein the machine readable instructions, when executed by the processor, cause the network interface hardware to transmit the output indicative of the recognized text to a portable electronic device.

12. The imaging glove of claim 9, wherein the finger camera is recessed in the finger portion.

13. The imaging glove of claim 9, wherein the finger portion is a pinky portion configured to be coupled to a pinky finger of a user when the user wears the imaging glove.

14. The imaging glove of claim 9, wherein the imaging glove is configured such that when the imaging glove is worn on a hand of a user, a portion of at least one finger of the user is exposed.

15. An imaging glove comprising:
  a wrist portion;
  a finger portion extending from the wrist portion;
  a wrist camera coupled to the wrist portion;
  a finger camera coupled to the finger portion;
  a proximity sensor coupled to the finger portion;
  a temperature sensor coupled to the finger portion;
  a processor communicatively coupled to the wrist camera, the finger camera, the proximity sensor, and the temperature sensor;
  a memory module communicatively coupled to the processor; and
  machine readable instructions stored in the memory module that cause the imaging glove to perform at least the following when executed by the processor:
    receive image data from the wrist camera or the finger camera;
    recognize an object in the received image data;
    determine a proximity of the imaging glove to the object;
    determine a temperature of the object; and
    provide output indicative of at least one of the recognized object, the determined proximity, and the determined temperature,
  wherein the wrist camera is pointed toward a palm of the imaging glove, and
  wherein a first distance between a finger camera focal point and the finger camera is smaller than a second distance between a wrist camera focal point and the wrist camera.

16. The imaging glove of claim 15, wherein the finger camera is recessed in the finger portion.

17. The imaging glove of claim 15, wherein the finger portion is a pinky portion configured to be coupled to a pinky finger of a user when the user wears the imaging glove.

18. The imaging glove of claim 15, wherein the imaging glove is configured such that when the imaging glove is worn on a hand of a user, a portion of at least one finger of the user is exposed.

* * * * *

UNITED STATES PATENT AND TRADEMARK OFFICE
CERTIFICATE OF CORRECTION

PATENT NO. : 10,380,914 B2
APPLICATION NO. : 14/567054
DATED : August 13, 2019
INVENTOR(S) : Douglas A. Moore et al.

It is certified that error appears in the above-identified patent and that said Letters Patent is hereby corrected as shown below:

On the Title Page

Item (73), assignee, delete "TOYOTA MOTOR ENGINEERING & MANUFACTURNIG NORTH AMERICA, INC." and insert --TOYOTA MOTOR ENGINEERING & MANUFACTURING NORTH AMERICA, INC.--, therefor.

In the Specification

In Column 5, Line 13, delete "minor" and insert --mirror--, therefor.

Signed and Sealed this
First Day of October, 2019

Andrei Iancu
*Director of the United States Patent and Trademark Office*